(12) United States Patent
Hosoi et al.

(10) Patent No.: US 9,316,750 B2
(45) Date of Patent: Apr. 19, 2016

(54) RADIATION IMAGE DETECTING DEVICE AND RADIATION IMAGE CAPTURING SYSTEM

(71) Applicant: FUJIFILM Corporation, Tokyo (JP)

(72) Inventors: Yuichi Hosoi, Ashigarakami-gun (JP); Masaharu Nakatsu, Ashigarakami-gun (JP); Takafumi Hironaka, Ashigarakami-gun (JP); Hideyuki Noumura, Ashigarakami-gun (JP); Haruyasu Nakatsugawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/323,051

(22) Filed: Jul. 3, 2014

(65) Prior Publication Data

US 2014/0312237 A1  Oct. 23, 2014

Related U.S. Application Data (63) Continuation of application No. PCT/JP2013/052549, filed on Feb. 5, 2013.

(30) Foreign Application Priority Data

Mar. 12, 2012  (JP) ................................. 2012-054506

(51) Int. Cl.
 *G01T 1/20* (2006.01)
 *G21K 4/00* (2006.01)

(52) U.S. Cl.
 CPC ............. *G01T 1/2018* (2013.01); *G01T 1/2008* (2013.01); *G01T 1/2012* (2013.01); *G21K 4/00* (2013.01)

(58) Field of Classification Search
 CPC ... G01T 1/2008; G01T 1/2012; G01T 1/2018; G21K 4/00
 See application file for complete search history.

(56) References Cited

U.S. PATENT DOCUMENTS 4,486,486 A   12/1984  Maeoka et al.
4,507,563 A    3/1985  Maeoka et al.
(Continued)

FOREIGN PATENT DOCUMENTS

EP   0 088 820 A1   9/1983
JP   11-183698 A    7/1999
(Continued)

OTHER PUBLICATIONS

Machine translation of JP2010112733A (based on equivalent publication JP5313632B2).*
(Continued)

*Primary Examiner* — Mark R Gaworecki
(74) *Attorney, Agent, or Firm* — Birch, Stewart, Kolasch & Birch, LLP (57) ABSTRACT

A radiation image capturing system includes a radiation source and a radiation image detecting device. The radiation image detecting device includes a solid-state detector and a wavelength conversion layer disposed in this order from a radiation incident side. The wavelength conversion layer has a first phosphor layer having first phosphor particles dispersed in a binder, and a second phosphor layer having second phosphor particles dispersed in a binder. The average particle diameter of the second phosphor particles is smaller than that of the first phosphor particles. The first phosphor layer is disposed on the side of the solid-state detector relative to the second phosphor layer, and joined to or pressed against the solid-state detector. The first and second phosphor particles are distributed in the first and second phosphor layers, respectively, such that the weight of the binder per unit thickness is gradually decreased to the side of the solid-state detector.

16 Claims, 7 Drawing Sheets

(56) References Cited

U.S. PATENT DOCUMENTS

| | | |
|---|---|---|
| 4,529,647 A | 7/1985 | Maeoka et al. |
| 4,536,436 A | 8/1985 | Maeoka et al. |
| 4,574,102 A | 3/1986 | Arakawa et al. |
| 4,835,396 A | 5/1989 | Kitada et al. |
| 5,877,503 A | 3/1999 | Neriishi |

FOREIGN PATENT DOCUMENTS

| | | |
|---|---|---|
| JP | 2000-155198 A | 6/2000 |
| JP | 2006-266936 A | 10/2006 |
| JP | 2010-101722 A | 5/2010 |
| JP | 2010-112733 A | 5/2010 |
| JP | 2010-121997 A | 6/2010 |

OTHER PUBLICATIONS

Machine translation of JP2006266936A.*

International Search Report issued in PCT/JP2013/052549, mailed on Mar. 5, 2013.

Written Opinion issued in PCT/JP2013/052549, mailed on Mar. 5, 2013.

* cited by examiner

RADIATION IMAGE DETECTING DEVICE AND RADIATION IMAGE CAPTURING SYSTEM

CROSS-REFERENCE TO RELATED APPLICATIONS

This application is a continuation of PCT International Application No. PCT/JP2013/052549 filed on Feb. 5, 2013, which claims priority under 35 U.S.C §119(a) to Japanese Patent Application No. 2012-054506 filed on Mar. 12, 2012. Each of the above applications is hereby expressly incorporated by reference, in its entirety, into the present application.

BACKGROUND OF THE INVENTION

1. Field of the Invention

The present invention relates to an indirect conversion type radiation image detecting device, and a radiation image capturing system having the radiation image detecting device.

2. Description Related to the Prior Art

In a medical field, a radiation image capturing system for imaging the inside of a body cavity becomes widespread. This radiation image capturing system is provided with a radiation source for applying radiation e.g. X-rays to an object, and a radiation image detecting device that converts the radiation passed through the object into electric charge and converts the electric charge into voltage to produce image data representing a radiation image of the object.

There are two types of radiation image detecting devices, that is, a direct conversion type for directly converting the radiation into the electric charge, and an indirect conversion type for temporarily converting the radiation into light (visible light) and converting the light into the electric charge. The indirect conversion type radiation image detecting device has a wavelength conversion layer for converting the radiation into the light, and a solid-state detector for converting the light produced by the wavelength conversion layer into the electric charge. The solid-state detector has a plurality of photodiodes.

The wavelength conversion layer contains a phosphor for converting the radiation into the light. The phosphor is made of particles (hereinafter called phosphor particles) such as GOS ($Gd_2O_2S:Tb$), or a columnar crystal such as CsI:Tl. The wavelength conversion layer of particle structure is in widespread use because of being easier to manufacture and less expensive than the wavelength conversion layer of columnar crystal structure. In the wavelength conversion layer of particle structure, the phosphor particles are dispersed into a binder (binding agent) such as resin.

The indirect conversion type radiation image detecting device has the wavelength conversion layer and the solid-state detector stacked in layers. The indirect conversion type radiation image detecting device is categorized in two types depending on which one of the wavelength conversion layer and the solid-state detector to dispose on the side of the radiation source. A method in which the wavelength conversion layer is disposed on the side of the radiation source is referred to as a PSS (penetration side sampling) method. On the contrary, a method in which the solid-state detector is disposed on the side of the radiation source is referred to as an ISS (irradiation side sampling) method (see Japanese Patent Laid-Open Publication No. 2010-112733 and the like).

The light is produced in the wavelength conversion layer upon incidence of the radiation, and the production of the light mainly occurs in a surface on a side upon which the radiation is incident. Thus, according to the PSS method, the light is produced in a surface of the wavelength conversion layer on an opposite side from the solid-state detector, and propagates through the wavelength conversion layer to the solid-state detector. Therefore, since a part of the light is absorbed by the wavelength conversion layer itself or scattered, there is a problem of deterioration in sensitivity (conversion efficiency from the radiation into the light) and sharpness of the image detected by the solid-state detector.

In the ISS method, on the other hand, the radiation passed through the solid-state detector is incident upon the wavelength conversion layer. Since the light is produced in the wavelength conversion layer on the side of the solid-state detector, the ISS method has the advantage that short propagation distance prevents deterioration in the sensitivity and the sharpness, contrarily to above.

For example, in the ISS method, thickening the wavelength conversion layer improves the sensitivity of the wavelength conversion layer. Thickening the wavelength conversion layer, however, causes emission of the light from the phosphor particles at positions far from the solid-state detector. The light emitted from the phosphor particles is widely expanded while propagating to the solid-state detector, so the sharpness of the image deteriorates. Also, for the purpose of improving the sensitivity of the wavelength conversion layer, the size of the phosphor particles is increased and the amount of light emitted from the phosphor particles is increased. In this case, the light that propagates from the phosphor particles to the solid-state detector is expanded further widely and the sharpness further deteriorates.

Thus, the Japanese Patent Laid-Open Publication No. 2010-112733 proposes to constitute the wavelength conversion layer of a stack of a first phosphor layer, which has phosphor particles having a small average particle diameter dispersed in a binder, and a second phosphor layer, which has phosphor particles having a large average particle diameter dispersed in a binder, and dispose the second phosphor layer on the side of the solid-state detector. The second phosphor layer has the large phosphor particles and produces a large amount of light, but the position of each phosphor particle is near the solid-state detector, and hence the expansion of the light is small and the sharpness less deteriorates. In the first phosphor layer, the position of each phosphor particle is far from the solid-state detector, but the size of the phosphor particles are small, and hence the expansion of the light is small and the sharpness less deteriorates. Therefore, this radiation image detecting device can improve the sensitivity without deterioration in the sharpness.

However, according to the radiation image detecting device described in the Japanese Patent Laid-Open Publication No. 2010-112733, in the second phosphor layer disposed on the side of the solid-state detector, the weight of the binder per unit thickness is increased gradually from the side of the first phosphor layer to the side of the solid-state detector, and a spatial filling rate of the phosphor particles is low on the side of the solid-state detector. Thus, this radiation image detecting device is susceptible to improvement in terms of the sharpness.

SUMMARY OF THE INVENTION

An object of the present invention is to provide a radiation image detecting device that has improved sharpness, and a radiation image capturing system having this radiation image detecting device.

To achieve the above and other objects of the present invention, a radiation image detecting device according to the present invention includes a wavelength conversion layer for converting radiation into light, and a solid-state detector for detecting the light and producing image data. The solid-state detector and the wavelength conversion layer are disposed in this order from an incident side of the radiation emitted from a radiation source during radiography. The wavelength conversion layer includes a first phosphor layer containing first phosphor particles dispersed in a binder, and a second phosphor layer containing second phosphor particles dispersed in a binder. The average particle diameter of the second phosphor particles is smaller than the average particle diameter of the first phosphor particles. The first phosphor layer and the second phosphor layer are laminated in this order from the side of the solid-state detector, and the first phosphor layer is joined to or pressed against the solid-state detector. The first and second phosphor layers are distributed such that the weight of the binder per unit thickness is gradually decreased to the side of the solid-state detector. The weight of the binder of the first phosphor layer is heavier than the weight of the binder of the second phosphor layer at an interface between the first and second phosphor layers.

The first phosphor particles preferably include first small phosphor particles having a first average particle diameter, and first large phosphor particles having a second average particle diameter larger than the first average particle diameter. The weight ratio of the first small phosphor particles to the first large phosphor particles is preferably 20% to 40%. It is preferable that the first average particle diameter be 1 μm or more and less than 5 μm, and the second average particle diameter be 5 μm or more and 12 μm or less.

The second phosphor particles preferably include second small phosphor particles having a third average particle diameter, and second large phosphor particles having a fourth average particle diameter larger than the third average particle diameter. The weight ratio of the second small phosphor particles to the second large phosphor particles is preferably 20% to 40%. It is preferable that the third average particle diameter be 1 μm or more and less than 5 μm, and the fourth average particle diameter be 5 μm or more and 12 μm or less.

The first and second phosphor particles are preferably composed of $A_2O_2S:X$, wherein A represents one of Y, La, Gd, and Lu, and X represents one of Eu, Tb, and Pr.

It is preferable that a support be provided to the wavelength conversion layer on an opposite side from the solid-state detector, for supporting the wavelength conversion layer. The wavelength conversion layer and the support are preferably joined by heat compression. The support preferably has a light-reflective layer on a surface opposed to the wavelength conversion layer.

A frame member is preferably provided to cover a side surface of the periphery of the wavelength conversion layer.

A radiation image capturing system according to the present invention includes a radiation source and a radiation image detecting device. The radiation source emits radiation. The radiation image detecting device includes a wavelength conversion layer for converting the radiation into light, and a solid-state detector for detecting the light and producing image data. The solid-state detector and the wavelength conversion layer are disposed in this order from an incident side of the radiation. The wavelength conversion layer includes a first phosphor layer containing first phosphor particles dispersed in a binder, and a second phosphor layer containing second phosphor particles dispersed in a binder. The average particle diameter of the second phosphor particles is smaller than the average particle diameter of the first phosphor particles. The first phosphor layer and the second phosphor layer are laminated in this order from the side of the solid-state detector, and the first phosphor layer is joined to or pressed against the solid-state detector. The first and second phosphor layers are distributed such that the weight of the binder per unit thickness is gradually decreased to the side of the solid-state detector. The weight of the binder of the first phosphor layer is heavier than the weight of the binder of the second phosphor layer at an interface between the first and second phosphor layers.

The first phosphor particles preferably include first small phosphor particles having a first average particle diameter, and first large phosphor particles having a second average particle diameter larger than the first average particle diameter. The second phosphor particles preferably include second small phosphor particles having a third average particle diameter, and second large phosphor particles having a fourth average particle diameter larger than the third average particle diameter.

It is preferable that the first and second phosphor particles be composed of $A_2O_2S:X$, wherein A represents one of Y, La, Gd, and Lu, and X represents one of Eu, Tb, and Pr.

According to the present invention, the first phosphor layer and the second phosphor layer are provided. The first phosphor layer contains the first phosphor particles dispersed in the binder. The second phosphor layer contains the binder dispersed with the second phosphor particles whose average particle diameter is smaller than that of the first phosphor particles. The first phosphor layer is disposed on the side of the solid-state detector relative to the second phosphor layer, and joined to or pressed against the solid-state detector. The first and second phosphor layers are distributed such that the weight of the binder per unit thickness is gradually decreased to the side of the solid-state detector. Therefore, the sharpness is further improved.

BRIEF DESCRIPTION OF DRAWINGS

For more complete understanding of the present invention, and the advantage thereof, reference is now made to the subsequent descriptions taken in conjunction with the accompanying drawings, in which.

DESCRIPTION OF THE PREFERRED EMBODIMENTS

First Embodiment

Figure 1:
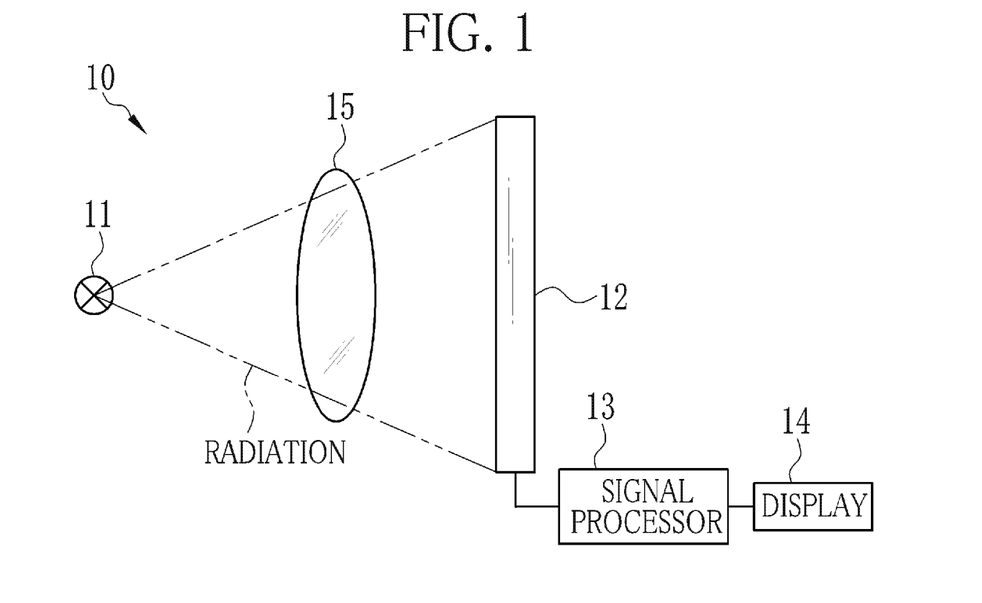
FIG. 1 is an explanatory view showing the structure of a radiation image capturing system.

In FIG. 1, a radiation image capturing system 10 has a radiation source 11, a radiation image detecting device 12, a signal processor 13, and a display 14. The radiation source 11 emits radiation (X-rays) to an object 15. The radiation image detecting device 12 detects the radiation passed through the object 15, and detects a radiation image of the object 15, which is carried by the radiation, to produce and output image data. The signal processor 13 applies predetermined signal processing to the image data outputted from the radiation image detecting device 12. The display 14 displays an image based on the image data to which the signal processor 13 has applied the signal processing.

Figure 2:
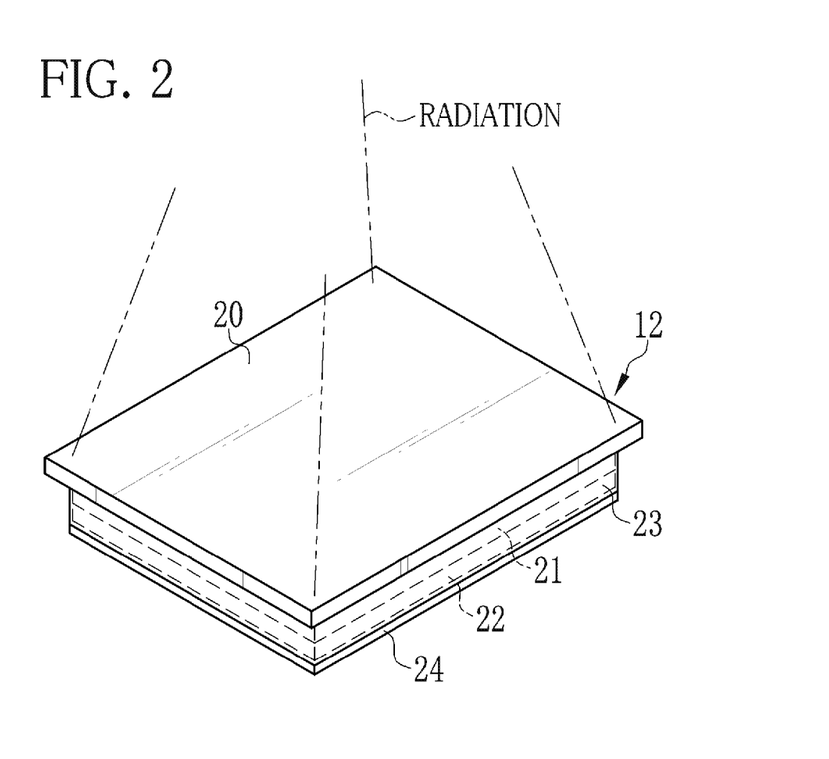
FIG. 2 is a perspective view of a radiation image detecting device.

In FIG. 2, the radiation image detecting device 12 is composed of a solid-state detector 20, a wavelength conversion layer 21, a support 22, a frame member 23, and a protective layer 24. The solid-state detector 20, the wavelength conversion layer 21, the support 22, and the protective layer 24 are stacked in this order from the side of the radiation source 11. The radiation that has been emitted from the radiation source 11 and passed through the object 15 is incident upon the wavelength conversion layer 21 through the solid-state detector 20. The protective layer 24 is provided with a radiation shielding plate (not shown) such as a lead plate on an opposite side from a radiation incident side.

The wavelength conversion layer 21 is a phosphor layer (scintillator) for converting the radiation incident during radiography into light (visible light). The solid-state detector 20 detects the visible light converted by the wavelength conversion layer 21 to produce the image data. The frame member 23 covers side surfaces of the peripheries of the wavelength conversion layer 21 and the support 22. The protective layer 24 covers a surface of the support 22 on an opposite side from the wavelength conversion layer 21.

The radiation image detecting device 12 is often used in the form of an electronic cassette, which is detachably loaded in an imaging stand. In the electronic cassette, the radiation image detecting device 12 is contained in a housing (not shown). The housing also contains an image memory and a battery (none of them is illustrated). The housing is provided with alignment marks for use in positioning of the radiation source 11 and the object 15 in its incident surface on a radiation incident side.

Figure 3:
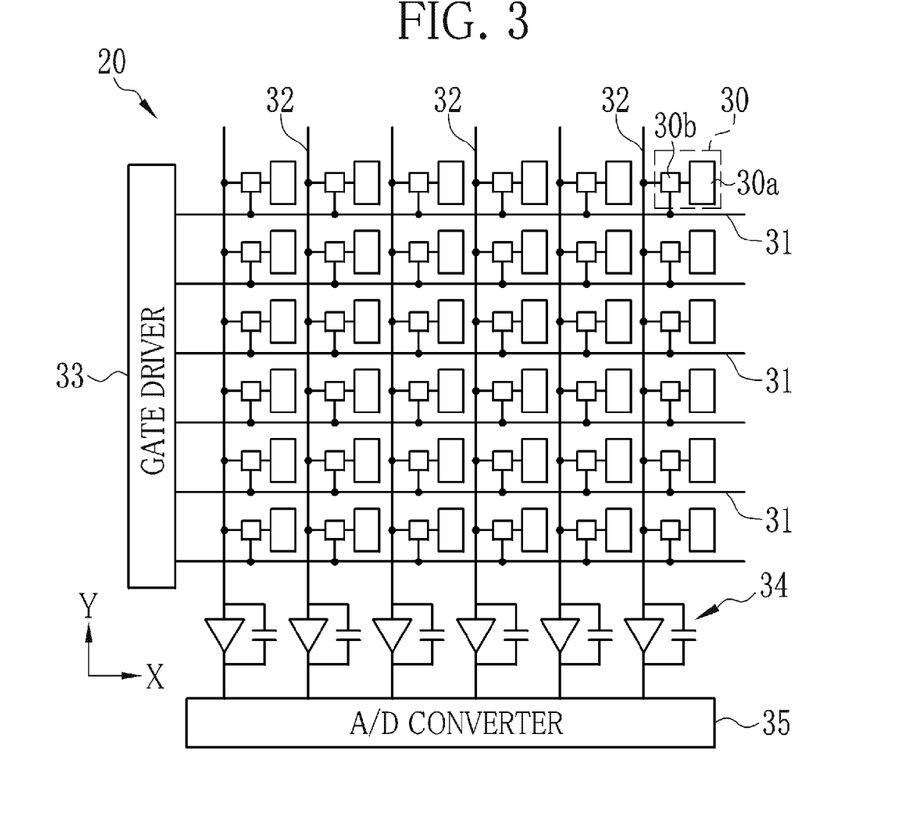
FIG. 3 is an explanatory view showing the structure of a solid-state detector.

In FIG. 3, the solid-state detector 20 is provided with a plurality of pixels 30, a plurality of scan lines 31, a plurality of data lines 32, a gate driver 33, a plurality of integration amplifiers 34, and an A/D converter 35. The pixels 30 each of which includes a photodiode 30a and a TFT switch 30b is arrayed in two dimensions in X and Y directions. The scan lines 31 are provided on a row-by-row basis of the pixels 30 extending in the X direction. To the scan lines 31, a scan signal is applied to drive the TFT switches 30b. The data lines 32 are provided on a column-by-column basis of the pixels 30 extending in the Y direction. Signal charge that is accumulated in the photodiode 30a and read out via the TFT switch 30b flows through the data line 32.

The photodiode 30a produces the signal charge in accordance with the light produced by the wavelength conversion layer 21, and accumulates the signal charge. The TFT switch 30b, which is disposed so as to correspond to each intersection between the scan line 31 and the data line 32, is connected to the photodiode 30a.

The gate driver 33 is connected to one end of each scan line 31, and applies the scan signal sequentially to the scan lines 31. The integration amplifier 34 is connected to one end of each data line 32. The integration amplifier 34 integrates the signal charge flowing through each data line 32, and outputs voltage corresponding to the amount of integrated electric charge. The A/D converter 35 provided on an output side of each integration amplifier 34 converts the voltage outputted from the integration amplifier 34 into a digital signal. A voltage amplifier, a multiplexer, and the like (none of them is shown) are provided between the integration amplifier 34 and the A/D converter 35. The digital signals of all the pixels, which are outputted from the A/D converter 35, compose the image data described above.

Figure 4:
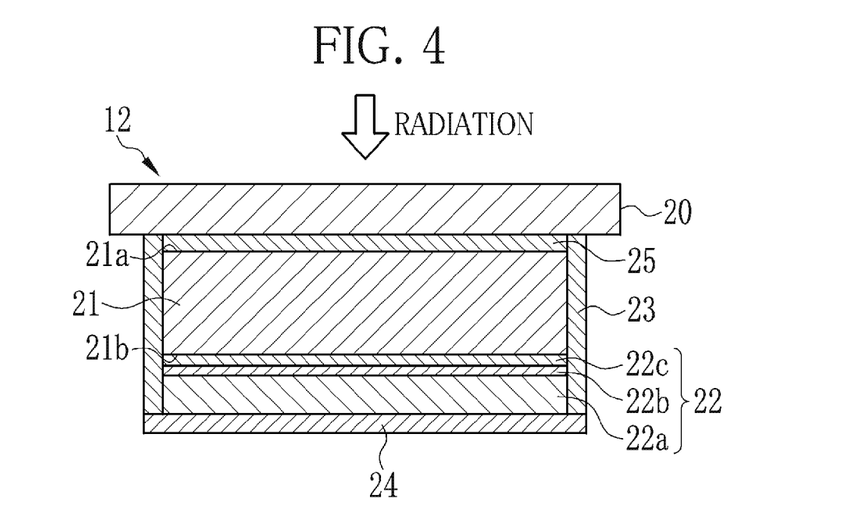
FIG. 4 is a cross sectional view of the radiation image detecting device taken on a direction along radiation.

In FIG. 4, the wavelength conversion layer 21 is joined to the solid-state detector 20 at its first surface 21a via an adhesive layer 25, and joined to the support 22 at its second surface 21b. The adhesive layer 25 is made of acrylic material. The support 22 includes a resin film 22a, a conductive layer 22b, and a light-reflective layer 22c stacked in this order. To the light-reflective layer 22c, the second surface 21b of the wavelength conversion layer 21 is joined. The protective layer 24 covers a bottom surface of the support 22.

The frame member 23 is made of resin or the like. It is desirable that the thickness of the frame member 23 be 5 μm or more and 500 μm or less. The frame member 23 is a curing coating made of silicone polymer and polyisocyanate, for example.

As the silicone polymer, a polymer is used in which a composition (polymer, prepolymer, or monomer) mainly having a polysiloxane unit and another composition (polymer, prepolymer, or monomer) are bonded in alternate, block, or pendant positions by condensation reaction or polyaddition reaction. For example, there are polyurethane having the polysiloxane unit, polyurea having the polysiloxane unit, polyester having the polysiloxane unit, and acrylic resin having the polysiloxane unit.

As the polyisocyanate, various types of polyisocyanate monomers, adducts of polyol such as TMP (trimethylolpropane) and isocyanate such as TDI (tolylenediisocyanate) or polyisocyanate, polymers of TDI dimers or TDI trimers and a HMDI (hexamethylenediisocyanate) polymer or the like, and compounds such as isocyanate prepolymer obtained by a reaction between polyisocyanate and polyfunctional hydroxyl or amine, or between polyisocyanate and hydroxypolyether or polyester are available. A mixing ratio between the silicone polymer and the polyisocyanate is generally 99:1 to 10:90 (polymer:polyisocyanate) in weight, and preferably 95:5 to 20:80, and more preferably 90:10 to 70:30.

As a material for the resin film 22a of the support 22, polyethylene terephthalate (PET), cellulose acetate, polyester, polyamide, polyimide, triacetate, polycarbonate, and the like are available. The thickness of the resin film 22a is preferably 20 μm or more and 2 mm or less, and more preferably 70 μm or more and 0.5 mm or less.

In the conductive layer 22b, a conductive agent such as $SnO_2$ is dispersed in resin such as polyester. In the light-reflective layer 22c, a light-reflective material such as alumina fine particles is dispersed in resin such as acrylic. As the protective layer 24, super barrier film (SBF: trademark) made by FUJIFILM Corporation is used.

The frame member 23 may be conductive. For example, conductive fine particles such as $SnO_2$:Sb and ZnO, or a carbon cluster such as carbon black, fullerene, and carbon nanotube is mixed to a polymer. In this case, it is preferable that the sheet resistance of the frame member 23 be $10^8 \Omega$ or less.

Figure 5:
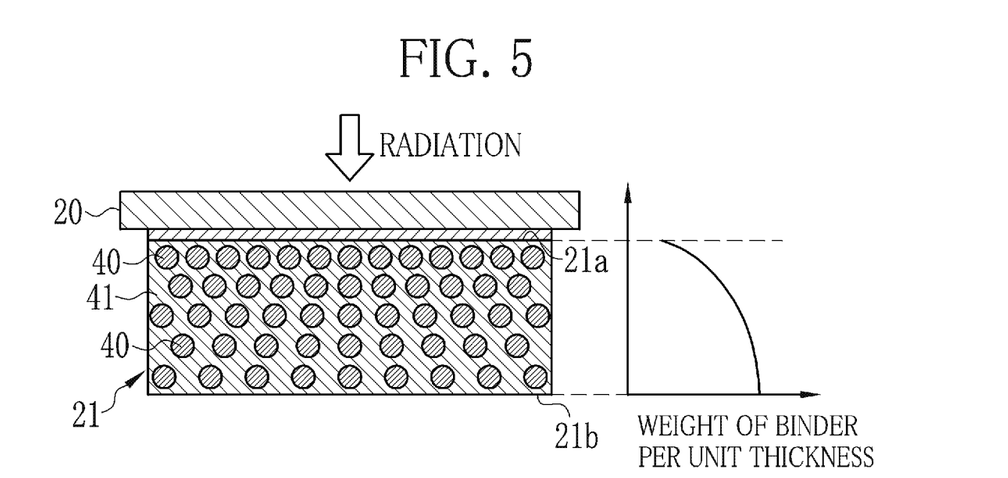
FIG. 5 is an explanatory view showing the structure of a wavelength conversion layer.

In FIG. 5, the wavelength conversion layer 21 is formed by dispersing phosphor particles 40 such as GOS ($Gd_2O_2S$:Tb) in a binder (binding agent) 41 such as resin. The phosphor particle 40 is illustrated in a spherical shape, but in actual fact, is in a distorted polygonal shape. The average particle diameter of the phosphor particles 40 is of the order of 5 μm. Note that, the average particle diameter refers to an average value of particle diameters measured with a Fisher Sub-Sieve Sizer, for example.

As the phosphor particles 40, particles represented by $A_2O_2S$:X (wherein, A represents one of Y, La, Gd, and Lu, and X represents one of Eu, Tb, Pr) are used. In the phosphor particles 40, cerium (Ce) or samarium (Sm) may be added to $A_2O_2S$:X as a coactivator. Furthermore, a mixed crystal phosphor may be used as the phosphor particles 40.

The weight of the binder 41 per unit thickness of the wavelength conversion layer 21 is gradually decreased from the side of the second surface 21b, being opposite from the radiation incident side, to the side of the first surface 21a. In other words, the spatial filling rate of the phosphor particles 40 per unit thickness is gradually increased from the side of the second surface 21b to the side of the first surface 21a. Thus, the spatial filling rate of the phosphor particles 40 is high on the side of the solid-state detector 20 and low at a position away from the solid-state detector 20. Therefore, the wavelength conversion layer 21 produces a large amount of light on the side of the solid-state detector 20, and the light is prevented from expanding while propagating from the phosphor particles 40 to the solid-state detector 20. Accordingly, it is possible to improve the sensitivity of the wavelength conversion layer 21 and the sharpness of the image detected by the solid-state detector 20.

It is preferable that the spatial filling rate of the phosphor particles 40 in the wavelength conversion layer 21 be 63% or more. In general, the spatial filling rate of a phosphor is calculated by the following way. First, apart of a wavelength conversion layer is cut out, and the volume of the part is measured. Then, the weight of the phosphor extracted from the wavelength conversion layer is measured by using a solvent or the like, and the volume of the phosphor is calculated using the density of the phosphor. The volume ratio between the above volumes is represented as the spatial filling rate of the phosphor. Note that, if the composition of the phosphor is unknown, composition analysis may be performed, and the density may be calculated from composition elements and crystal structure.

Figure 6:
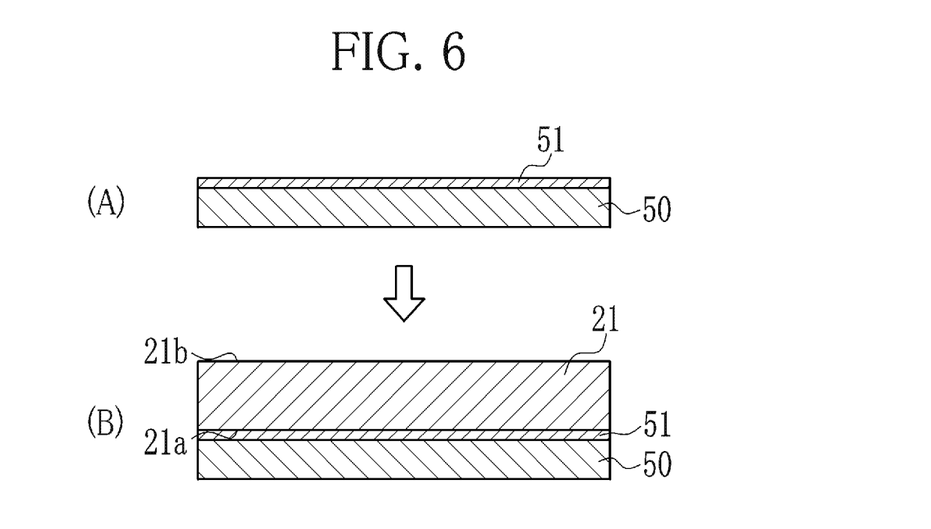
FIG. 6 is a first manufacturing process chart of the radiation image detecting device.

Next, a manufacturing method of the radiation image detecting device 12 will be described. First, as shown in FIG. 6(A), a temporary support 50 made of resin such as PET is prepared. A silicone release agent or the like is applied to a surface of the temporary support 50 so as to form a release agent layer 51.

As shown in FIG. 6(B), a phosphor coating liquid, which contains the phosphor particles 40 dispersed in a solution (binding agent solution) of the binder 41, is applied to the release agent layer 51 using a doctor blade and dried, so that the wavelength conversion layer 21 is formed as a phosphor sheet. In applying the phosphor coating liquid, the phosphor particles 40 have high specific gravity in the solution of the binder 41, and hence fall and move to the side of the temporary support 50 (the side of the first surface 21a). This movement is further accelerated by drying. As a result, the weight of the binder 41 per unit thickness of the wavelength conversion layer 21 is gradually decreased from the opposite side from the temporary support 50 (the side of the second surface 21b) to the side of the temporary support 50 (the side of the first surface 21a).

Figure 7:
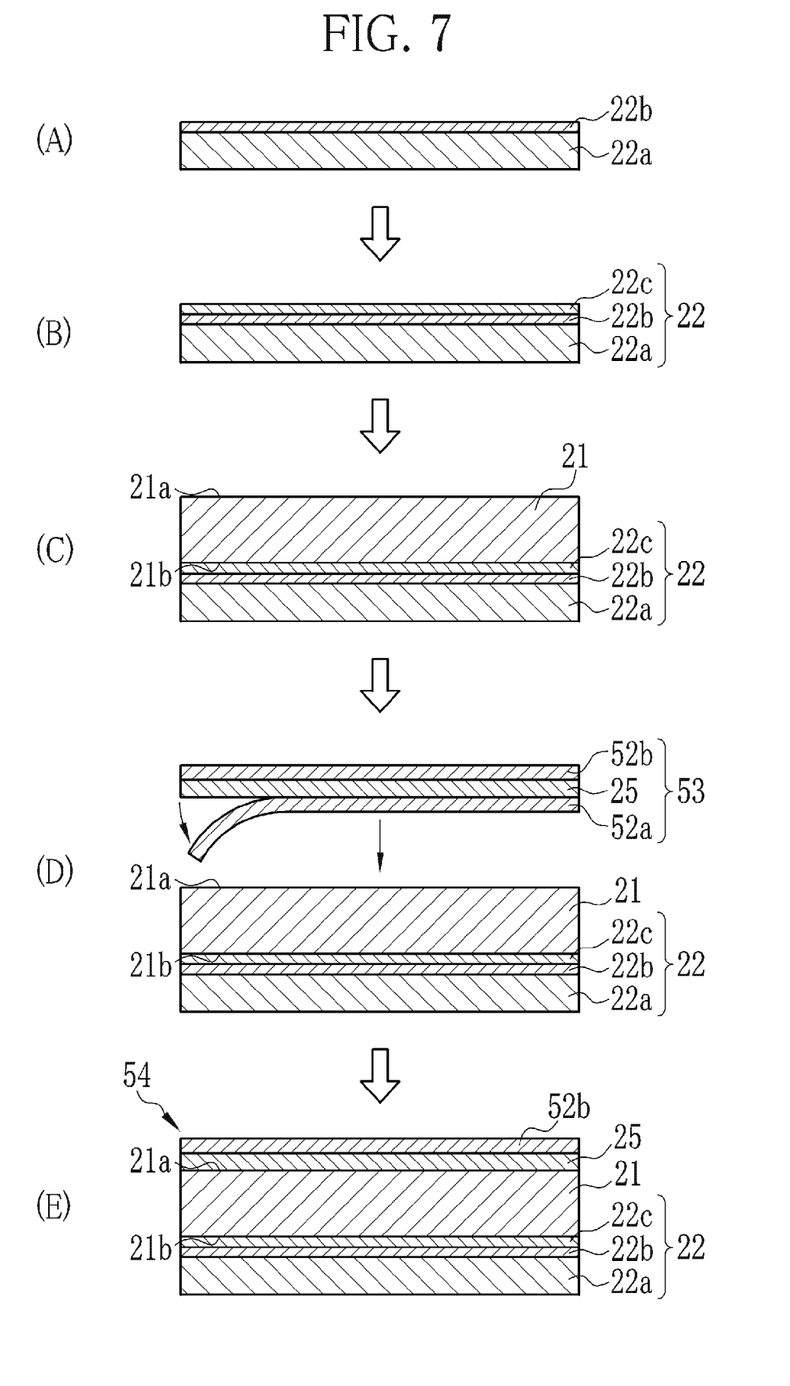
FIG. 7 is a second manufacturing process chart of the radiation image detecting device.

As shown in FIG. 7(A), a resin film 22a made of resin e.g. PET is prepared. By applying a conductive coating liquid to a surface of the resin film 22a and drying and curing the conductive coating liquid, the conductive layer 22b is formed. As shown in FIG. 7 (B), a coating liquid having the light-reflective material dispersed therein is applied to the conductive layer 22b using a doctor blade and dried to form the light-reflective layer 22c. The above-mentioned support 22 is completed thereby.

Then, the wavelength conversion layer 21 produced in step of FIG. 6(B) is peeled from the temporary support 50. As shown in FIG. 7(C), the wavelength conversion layer 21 is overlaid on the support 22 such that the second surface 21b contacts the light-reflective layer 22c. The wavelength conversion layer 21 and the support 22 stacked each other are heat-compressed using a calendar. Thus, the second surface 21b of the wavelength conversion layer 21 is fusibly adhered to the light-reflective layer 22c. Since the second surface 21b of the wavelength conversion layer 21 has a larger amount of binder 41 than the first surface 21a, an amount of binder 41 fused by the heat-compression is large in the second surface 21b. Thus, the second surface 21b is superior in adhesion to the light-reflective layer 22c.

As shown in FIG. 7(D), an adhesive sheet 53, having a first peeling film 52a, the adhesive layer 25, and a second peeling film 52b stacked in this order, is prepared, and the first peeling film 52a is peeled off. As shown in FIG. 7(E), the adhesive layer 25 is adhered to the wavelength conversion layer 21. The adhesive layer 25 is made of an acrylic adhesive agent. The first and second peeling films 52a and 52b are made of PET liners.

Figure 8:
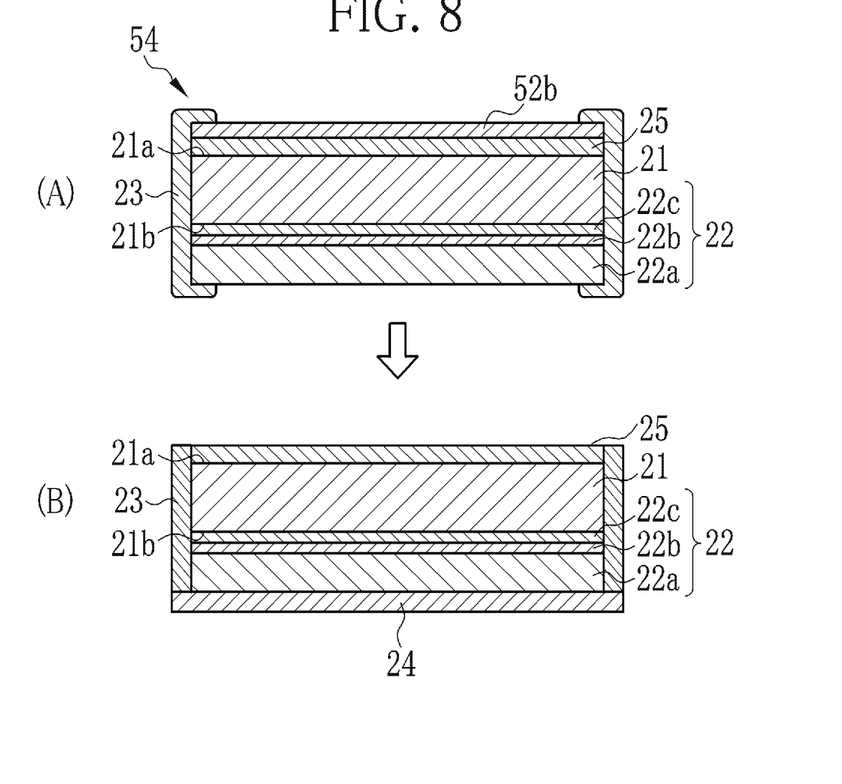
FIG. 8 is a third manufacturing process chart of the radiation image detecting device.

A radiation conversion sheet 54 produced in above steps is cut into a specific size. Then, as shown in FIG. 8(A), a side surface of the periphery of the cut radiation conversion sheet 54 is covered with the frame member 23 by using a dispenser. The frame member 23 covers the periphery of the second peeling film 52b and the periphery of the resin film 22a. Then, as shown in FIG. 8(B), the protective layer 24 is formed on a bottom surface of the resin film 22a.

After that, the second peeling film 52b is peeled off, and the first surface 21a of the wavelength conversion layer 21 is joined to a surface of the solid-state detector 20, manufactured by well-known semiconductor processing, through the adhesive layer 25. To be more specific, after the second peeling film 52b is peeled off, an ionizer removes dust from a surface of the adhesive layer 25. The radiation conversion sheet 54 is joined to the solid-state detector 20 via the adhesive layer 25 using a bonding machine. Pressing a roller against a back surface of the solid-state detector 20, the solid-state detector 20 is secured to the wavelength conversion layer 21. The radiation image detecting device 12 is completed in steps described above.

Dust is possibly produced during cutting the radiation conversion sheet 54 and forming the frame member 23. The dust adheres to the second peeling film 52b, and is removed by peeling off the second peeling film 52b. Even if the frame member 23 extends off the periphery of the second peeling film 52b, an extending portion is removed together with peeling off the second peeling film 52b, so there is no intervention of the frame member 23 between a formation area of the pixels 30 of the solid-state detector 20 and the wavelength conversion layer 21.

The wavelength conversion layer 21 is joined to the solid-state detector 20 at the first surface 21a having a little amount of binder 41. However, interposition of the adhesive layer 25 secures adhesion.

Next, the operation of the radiation image capturing system 10 will be described. First, the radiation is emitted from the radiation source 11 to the object 15. The radiation that has passed through the object 15 and carries the radiation image of the object enters the radiation image detecting device 12 from the side of the solid-state detector 20. The radiation that has entered the radiation image detecting device 12 passes through the solid-state detector 20 and enters the wavelength conversion layer 21 from the side of the first surface 21a. The wavelength conversion layer 21 converts the radiation incident thereon into the light (visible light).

On the side of the first surface 21a of the wavelength conversion layer 21, the amount of the binder 41 is small, and the spatial filling rate of the phosphor particles 40 is high. Thus, the amount of the light emitted from the phosphor particles 40 is large in the vicinity of the solid-state detector 20, and the expansion of the light propagating from the phosphor particles 40 to the solid-state detector 20 is small. On the side of the first surface 21a, the binder 41 of a small amount prevents the light from propagating in a horizontal direction (direction perpendicular to an incident direction of the radiation) through the binder 41.

The light converted by the wavelength conversion layer 21 is incident upon the solid-state detector 20. The solid-state detector 20 performs photoelectric conversion, and the signal charge produced by the photoelectric conversion is accumulated in each pixel 30. The solid-state detector 20 reads out the signal charge accumulated in each pixel 30. The solid-state detector 20 converts the signal charge of one screen into the image data, and outputs the image data.

The image data outputted from the solid-state detector 20 is inputted to the signal processor 13. The image data is subjected to the signal processing in the signal processor 13, and then inputted to the display 14. The display 14 displays the image based on the inputted image data.

A practical example of formation of the above-mentioned radiation conversion sheet 54 will be hereinafter described.

Practical Example 1

1. Formation of Wavelength Conversion Layer 20 wt % of a mixture of polyvinylbutyral resin, urethane resin, and plasticizer was dissolved in 80 wt % of a mixture solvent of toluene, 2-butanol, and xylene, and sufficiently stirred to make a solution of a binder (binding agent solution). This binding agent solution and $Gd_2O_2S$:Tb phosphors having an average particle diameter of 5 μm, as a solid component, were mixed at a wt % ratio of 15:85, and subjected to dispersion processing by a ball mill to prepare a phosphor coating liquid.

This phosphor coating liquid was applied at a width of 430 mm to a surface of PET (temporary support; a thickness of 190 μm) coated with a silicone release agent using a doctor blade, and dried. Then, by peeling from the temporary support, a wavelength conversion layer (a thickness of 300 μm) was obtained.

2. Formation of Conductive Layer

The following ingredients were added to 5 g of methyl ethyl ketone (MEK), and mixed and dispersed to prepare a coating liquid. This coating liquid was applied to a surface of a PET (support; a thickness of 188 μm, a degree of haze of 27%, LUMIRROR S-10 (trademark, made by TORAY Industries, Inc.)) using a doctor blade, and dried and cured to form a conductive layer (a thickness of 5 μm).

Resin: 20 g of a MEK solution (solid component of 30 wt %) of a saturated polyester resin (VYLON 300 (trademark, made by TOYOBO CO. Ltd.)

Curing agent: 2 g of polyisocyanate (OLESTER NP38-70S (trademark, made by Mitsui Chemicals Inc.), a solid component of 70%)

Conductive agent: 50 g of MEK (a solid component of 30 wt %) dispersed with $SnO_2$ (Sb doped) acicular fine particles 3. Formation of Light-Reflective Layer Then, the following ingredients were added to 387 g of MEK, and mixed and dispersed to prepare a coating liquid. This coating liquid was applied to a surface of the conductive layer using a doctor blade, and dried to form a light-reflective layer (a layer thickness of approximately 100 μm).

Light-reflective material: 444 g of high-purity alumina fine particles (an average particle diameter of 0.4 μm)

Binding agent: 100 g of a soft acrylic resin (CRISCOAT P-1018GS (trademark; made by Dainippon Ink and Chemicals, Inc.) "20% toluene solution")

4. Joining of Wavelength Conversion Layer and Light-Reflective Layer

The wavelength conversion layer manufactured in step 1 was overlaid on a surface of the light-reflective layer such that a top surface (an opposite side from the temporary support) of the wavelength conversion layer, in the course of manufacture by the application of the phosphor coating liquid, makes contact with the light-reflective layer, and heat-compressed by a calendar at a total load of 2300 kg, a temperature of an upper roll of 45° C., a temperature of a lower roll of 45° C., and a feeding speed of 0.3 m/min. Therefore, the wavelength conversion layer was completely fused to the light-reflective layer. The thickness of the layer after the heat compression was 200 μm.

5. Formation of Adhesive Layer and Peeling Films

An adhesive sheet composed of a PET liner of 38 μm (light peeling), an acrylic adhesive layer of 15 μm, and a PET liner of 75 μm (heavy peeling) was used. Stripping a film on the side of the light peeling, the adhesive layer was adhered to a phosphor layer.

6. Formation of Frame Member

After a radiation conversion sheet manufactured in steps 1 to 5 were cut into a specific size, the radiation conversion sheet was set in a dispenser of a frame member, and covered at a side surface of the periphery of the phosphor layer with the frame member by controlling a robot. As the frame member, was used a coating liquid that was prepared by dissolving a mixture of the following ingredients in 150 g of methyl ethyl ketone.

Silicone polymer: 700 g of polyurethane having a polydimethylsiloxane unit (DAIALLOMER SP3023, 15% methyl ethyl ketone solution, made by Dainichiseika Color & Chemicals Mfg. Co., Ltd.,)

Crosslinker: 30 g of polyisocyanate (CROSSNATE D-70, 50% solution, made by Dainichiseika Color & Chemicals Mfg. Co., Ltd.,)

Anti-yellowing agent: 6 g of an epoxy resin (EPIKOTE #1001, solid, made by Yuka Shell Epoxy Co., Ltd.)

Slipping agent: alcohol-modified silicone (X-22-2809, 66% xylene paste, made by Shin-Etsu Chemical Co., Ltd.)

Then, the obtained coating liquid was applied to the entire periphery (including 1 mm inward from edges) of the radiation conversion sheet after being subjected to corona discharge treatment, and completely dried at room temperature to form a peripheral coating having a coating thickness of approximately 25 µm.

Second Embodiment

The wavelength conversion layer is made of the single phosphor layer in the first embodiment, but may be made of lamination of a plurality of phosphor layers that contain the phosphor particles having different average particle diameters.

Figure 9:
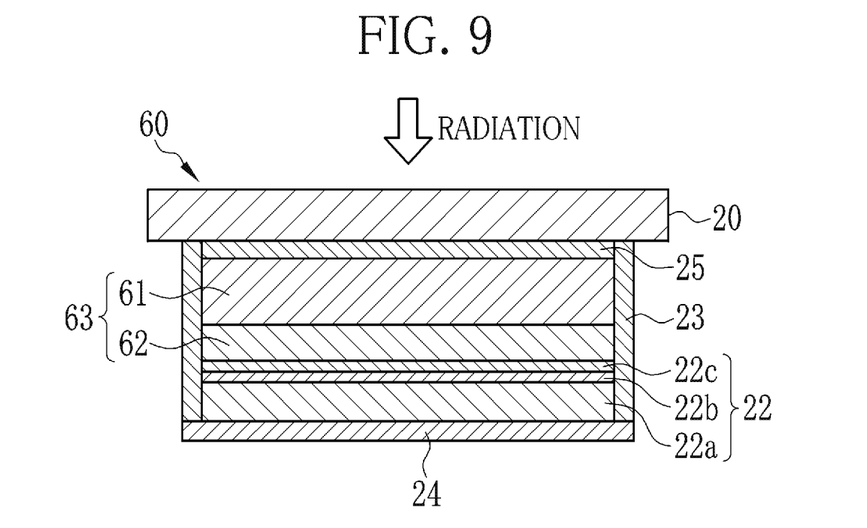
FIG. 9 is a cross sectional view of a radiation image detecting device according to a second embodiment taken on a direction along the radiation.
Figure 10:
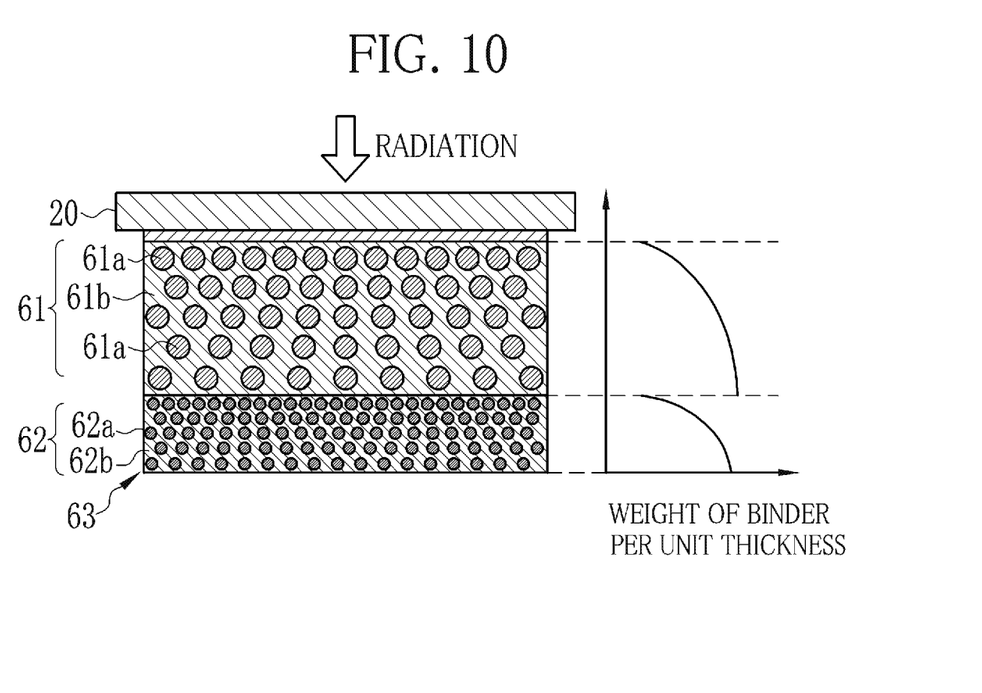
FIG. 10 is an explanatory view showing the structure of a wavelength conversion layer according to the second embodiment.

In FIGS. 9 and 10, a radiation image detecting device 60 according to a second embodiment has a wavelength conversion layer 63 that is formed of a lamination of a first phosphor layer 61 containing a plurality of first phosphor particles 61a and a second phosphor layer 62 containing a plurality of second phosphor particles 62a. The structure of the radiation image detecting device 60 is the same as that of the first embodiment, except for the wavelength conversion layer 63.

The average particle diameter of the first phosphor particles 61a is larger than the average particle diameter of the second phosphor particles 62a. The average particle diameter of the first phosphor particles 61a is preferably 5 µm or more and 12 µm or less. The average particle diameter of the second phosphor particles 62a is preferably 1 µm or more and less than 5 µm.

Just as with the phosphor particles 40 of the first embodiment, the first and second phosphor particles 61a and 62a are represented by $A_2O_2S:X$ (A is one of Y, La, Gd, and Lu, and X is one of Eu, Tb, and Pr), and, for example, GOS. In the first and second phosphor particles 61a and 62a, Ce or Sm may be added to $A_2O_2S:X$ as a coactivator. Furthermore, a mixed crystal phosphor may be used as the first and second phosphor particles 61a and 62a.

The first phosphor particles 61a are dispersed in a binder 61b. The weight of the binder 61b per unit thickness of the first phosphor layer 61 is gradually decreased from an opposite side from a radiation incident side to the radiation incident side (the side of the solid-state detector 20).

The second phosphor particles 62a are dispersed in a binder 62b. The weight of the binder 62b per unit thickness of the second phosphor layer 62 is gradually decreased from an opposite side from the radiation incident side to the radiation incident side (the side of the solid-state detector 20), just as with the first phosphor layer 61.

The wavelength conversion layer 63 is provided with the second phosphor layer 62 on the opposite side from the radiation incident side. The second phosphor layer 62 facilitates improving sensitivity without degrading sharpness, owing to the small average particle diameter of the second phosphor particles 62a.

To manufacture the wavelength conversion layer 63, by using the same method as the wavelength conversion layer 21 of the first embodiment uses, the first phosphor layer 61 may be formed on the temporary support, and the second phosphor layer 62 may be formed on the first phosphor layer 61. This manufacturing method is called a multi-layer coating method, in which phosphor coating liquids containing phosphor particles having different average particle diameters are applied and dried two times.

The smoothness of the phosphor coating liquid varies in accordance with the degree of dryness. Thus, before a phosphor coating liquid for forming the first phosphor layer 61 that has been applied to the temporary support is dried sufficiently, applying a phosphor coating liquid for forming the second phosphor layer 62 and drying the phosphor coating liquids make a surface of the first phosphor layer 61 rough. Therefore, it is possible to improve adhesion at an interface between the first phosphor layer 61 and the second phosphor layer 62.

On the contrary, applying the phosphor coating liquid for forming the second phosphor layer 62, after the phosphor coating liquid for forming the first phosphor layer 61 that has been applied to the temporary support is dried sufficiently, increases the smoothness of the interface between the first phosphor layer 61 and the second phosphor layer 62, and prevents the occurrence of image unevenness.

Note that, to manufacture the wavelength conversion layer 63, the first phosphor layer 61 and the second phosphor layer 62 may be formed independently, and then the first phosphor layer 61 and the second phosphor layer 62 may be joined by heat compression or the like.

In this embodiment, the first phosphor layer 61 contributes improvement in sensitivity and sharpness, because the density of the first phosphor particles 61a is high on the radiation incident side and the average particle diameter of the first phosphor particles 61a is larger than that of the second phosphor particles 62a of the second phosphor layer 62.

Since the density of the second phosphor particles 62a is high on the radiation incident side in the second phosphor layer 62, almost all radiation that has passed through the first phosphor layer 61 and entered the second phosphor layer 62 is absorbed by the second phosphor particles 62a and makes the second phosphor particles 62a emit light immediately after the entrance. This emission point is small in size, and almost all the emission points are positioned on the side of the solid-state detector 20. Therefore, it is possible to minimize deterioration in sharpness caused by emission of light at the second phosphor layer 62, which is far from the solid-state detector 20.

Furthermore, according to this embodiment, at the interface between the first phosphor layer 61 and the second phosphor layer 62, the surface of the first phosphor layer 61, which has a large amount of binder and is soft, has good adhesion to a surface of the second phosphor layer 62 (i.e. the surface of the first phosphor layer 61 can absorb unevenness of the surface), though the surface of the second phosphor layer 62 has low smoothness because of high density of the second phosphor particles 62a.

Adhering surfaces each having a large amount of binder to each other causes an image blur, because of increase in an area having low phosphor density. On the other hand, adhering surfaces each having a small amount of binder causes bad adhesion and is apt to peel. However, according to this embodiment, a surface having a large amount of binder and a surface having a small amount of binder are adhered. This is the most preferable for improving the adhesion and the sharpness.

Third Embodiment

Figure 11:
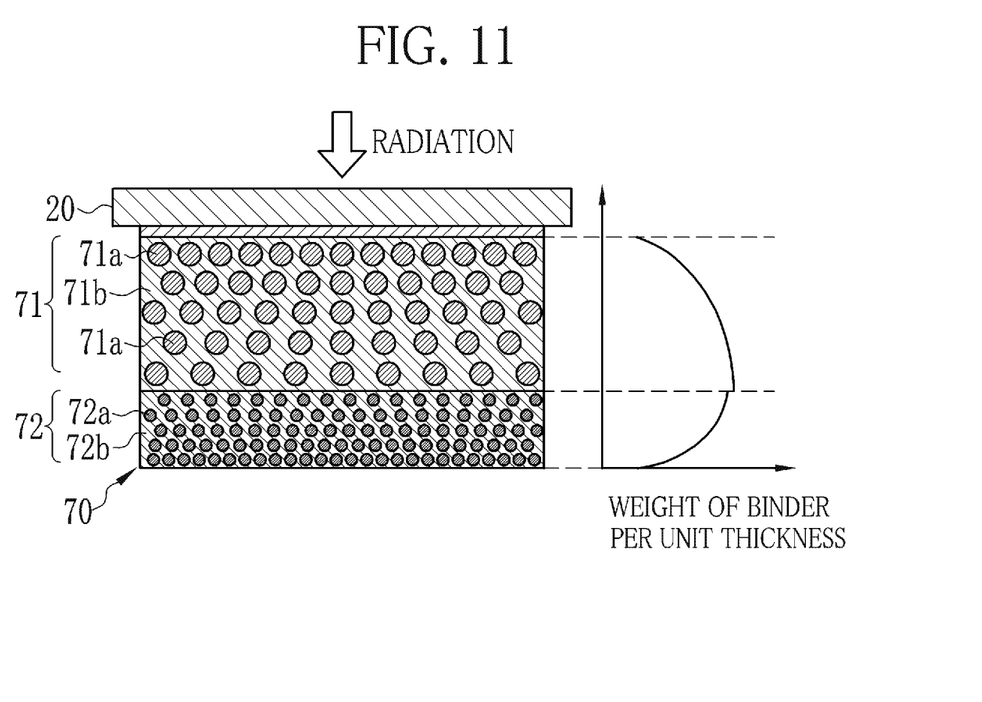
FIG. 11 is an explanatory view showing the structure of a wavelength conversion layer according to a third embodiment.

Next, a wavelength conversion layer 70 as shown in FIG. 11 is used in a third embodiment. The wavelength conversion layer 70 is composed of a first phosphor layer 71 and a second phosphor layer 72. The wavelength conversion layer 70 has the same structure as the wavelength conversion layer 63 of the second embodiment, except that the increase/decrease direction of the weight of a binder differs in the second phosphor layer 72.

The first phosphor layer 71 is identical to the first phosphor layer 61 of the second embodiment. As the second phosphor layer 72, the second phosphor layer 62 of the second embodiment is disposed in an opposite direction relative to radiation. In the first phosphor layer 71, first phosphor particles 71*a* having a large average diameter are dispersed in a binder 71*b*. In the second phosphor layer 72, second phosphor particles 72*a* having a small average diameter are dispersed in a binder 72*b*. The average particle diameters and the material of the first and second phosphor particles 71*a* and 72*a* are the same as those of the first and second phosphor particles 61*a* and 62*a* of the second embodiment.

The weight of the binder 71*b* per unit thickness of the first phosphor layer 71 is gradually decreased from an opposite side from a radiation incident side to the radiation incident side (the side of the solid-state detector 20). On the other hand, the weight of the binder 72*b* per unit thickness of the second phosphor layer 72 is gradually increased from the opposite side from the radiation incident side to the radiation incident side (the side of the solid-state detector 20).

To manufacture the wavelength conversion layer 70, the first phosphor layer 71 and the second phosphor layer 72 may be formed independently by applying phosphor coating liquids to temporary supports and drying the phosphor coating liquids. Then, the first phosphor layer 71 and the second phosphor layer 72 may be joined by heat compression or the like, so as to make opposite surfaces from the temporary support opposed to each other. Since both of the opposed surfaces of the first phosphor layer 71 and the second phosphor layer 72 have a large amount of binder and hence good adhesion.

Fourth Embodiment

According to the first embodiment, the wavelength conversion layer is formed by dispersing the phosphor particles of a uniform size in the binder. However, a wavelength conversion layer may be formed by mixing two types of phosphor particles (small phosphor particles and large phosphor particles) of different sizes in a binder. In this case, the small phosphor particles get into space between the large phosphor particles, and hence a spatial filling rate is increased and image quality is improved.

Figure 12:
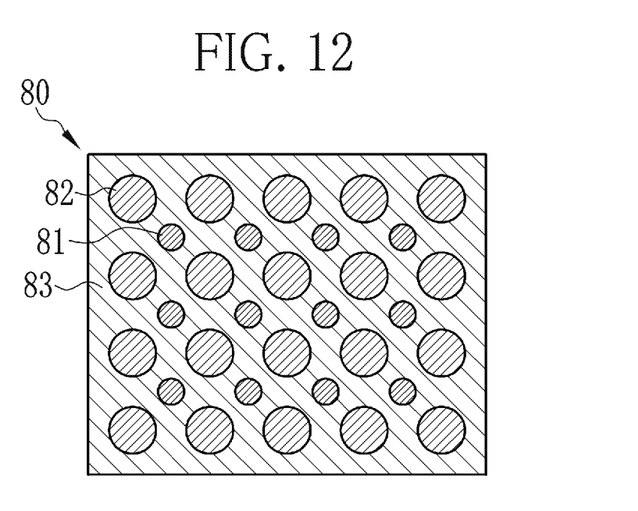
FIG. 12 is a longitudinal sectional view of a wavelength conversion layer according to a fourth embodiment taken on a direction orthogonal to the radiation.

A wavelength conversion layer 80, as shown in FIG. 12, is used in a fourth embodiment. In the wavelength conversion layer 80, small phosphor particles 81 and large phosphor particles 82 are dispersed in a binder 83. The average phosphor diameter of the small phosphor particles 81 is preferably 1 μm or more and less than 5 μm, and more preferably of the order of 2 μm. The average phosphor diameter of the large phosphor particles 82 is 5 μm or more and 12 μm or less, and more preferably of the order of 6 μm.

Both of the small phosphor particles 81 and the large phosphor particles 82 may be made of the same material (for example, GOS) or different materials (for example, GOS and LOS ($Lu_2O_2S$:Tb)).

Figure 13:
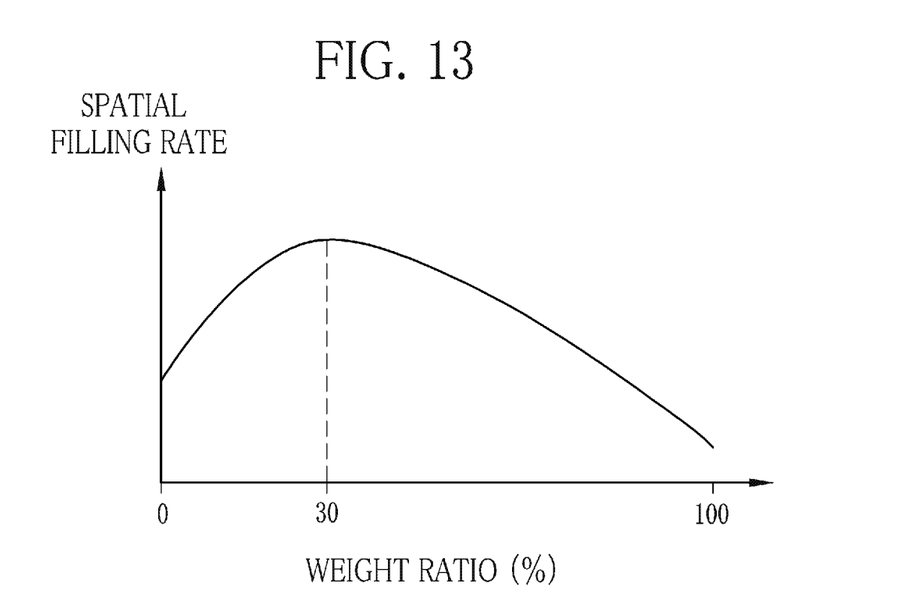
FIG. 13 is a graph showing the relation between a spatial filling rate of first and second phosphor particles and the weight ratio between the first and second phosphor particles.

A spatial filling rate SFR of a combination of the small phosphor particles 81 and the large phosphor particles 82 in the wavelength conversion layer 80 depends on the weight ratio WR of the small phosphor particles 81 to the large phosphor particles 82. More specifically, provided that the average particle diameter of the small phosphor particles 81 is 2 μm and the average particle diameter of the large phosphor particles 82 is 6 μm, as shown in FIG. 13, the spatial filling rate SFR reaches a maximum at a weight ratio WR of approximately 30%. The weight ratio WR is preferably within the confines of 20% to 40%. In this confines, a spatial filling rate SFR of approximately 63% or more is obtained.

To manufacture the wavelength conversion layer 80, a phosphor coating liquid that contains the small phosphor particles 81 and the large phosphor particles 82 dispersed in a solution of the binder 83 may be applied to a temporary support and dried. The weight of the binder 83 per unit thickness of the wavelength conversion layer 80 is gradually decreased from an opposite side from the temporary support to the side of the temporary support. A surface of the wavelength conversion layer 80 on the side of the temporary support is joined to the solid-state detector 20. The other structure of the fourth embodiment is the same as that of the first embodiment.

Note that, each of the first phosphor layers and the second phosphor layers according to the second embodiment and the third embodiment may contain two types of different sized phosphor particles (small phosphor particles and large phosphor particles) mixed in a binder. To be more specific, first small phosphor particles and first large phosphor particles whose average particle diameter is larger than that of the first small phosphor particles are mixed in the first phosphor layer. Second small phosphor particles and second large phosphor particles whose average particle diameter is larger than that of the second small phosphor particles are mixed in the second phosphor layer.

Just as with the first small phosphor particles and the first large phosphor particles, it is preferable that the average particle diameter of the second small phosphor particles be 1 μm or more and less than 5 μm, and the average particle diameter of the second large phosphor particles be 5 μm or more and 12 μm or less. The weight ratio of the second small phosphor particles to the second large phosphor particles is preferably within the confines of 20% to 40%. Furthermore, the size of each type of phosphor particles may be determined such that the average particle diameter of a combination of the first small phosphor particles and the first large phosphor particles is made larger than the average particle diameter of a combination of the second small phosphor particles and the second large phosphor particles.

In each of the above embodiments, the wavelength conversion layer is joined to the solid-state detector through the adhesive layer. However, the wavelength conversion layer may be pressed against the solid-state detector such that the wavelength conversion layer directly makes contact with the solid-state detector.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A radiation image detecting device comprising:
   (a) a solid-state detector for detecting light and producing image data; and
   (b) a wavelength conversion layer for converting radiation into said light, said solid-state detector and said wavelength conversion layer being disposed in this order from an incident side of said radiation emitted from a radiation source during radiography, said wavelength conversion layer including:
   a first phosphor layer containing first phosphor particles dispersed in a binder; and a second phosphor layer containing second phosphor particles dispersed in a binder, the average particle diameter of said second phosphor particles being smaller than the average particle diameter of said first phosphor particles, wherein said first phosphor layer and said second phosphor layer are laminated in this order from the side of said solid-state detector, and said first phosphor layer is joined to or pressed against said solid-state detector, and said first and second phosphor layers are distributed such that the weight of said binder per unit thickness is gradually decreased to the side of said solid-state detector, and the weight of said binder of said first phosphor layer is heavier than the weight of said binder of said second phosphor layer at an interface between said first and second phosphor layers.

2. The radiation image detecting device according to claim 1, wherein said first phosphor particles include first small phosphor particles having a first average particle diameter, and first large phosphor particles having a second average particle diameter larger than said first average particle diameter.

3. The radiation image detecting device according to claim 2, wherein the weight ratio of said first small phosphor particles to said first large phosphor particles is 20% to 40%.

4. The radiation image detecting device according to claim 3, wherein said first average particle diameter is 1 µm or more and less than 5 µm, and said second average particle diameter is 5 µm or more and 12 µm or less.

5. The radiation image detecting device according to claim 2, wherein said second phosphor particles include second small phosphor particles having a third average particle diameter, and second large phosphor particles having a fourth average particle diameter larger than said third average particle diameter.

6. The radiation image detecting device according to claim 5, wherein the weight ratio of said second small phosphor particles to said second large phosphor particles is 20% to 40%.

7. The radiation image detecting device according to claim 6, wherein said third average particle diameter is 1 µm or more and less than 5 µm, and said fourth average particle diameter is 5 µm or more and 12 µm or less.

8. The radiation image detecting device according to claim 1, wherein said first and second phosphor particles are composed of $A_2O_2S:X$, wherein A represents one of Y, La, Gd, and Lu, and X represents one of Eu, Tb, and Pr.

9. The radiation image detecting device according to claim 1, further comprising:

a support provided to said wavelength conversion layer on an opposite side from said solid-state detector, for supporting said wavelength conversion layer.

10. The radiation image detecting device according to claim 9, wherein said wavelength conversion layer and said support are joined by heat compression.

11. The radiation image detecting device according to claim 9, wherein said support has a light-reflective layer on a surface opposed to said wavelength conversion layer.

12. The radiation image detecting device according to claim 1, further comprising:

a frame member for covering a side surface of the periphery of said wavelength conversion layer.

13. A radiation image capturing system comprising:

(A) a radiation source for emitting radiation; and (B) a radiation image detecting device including:

(a) a solid-state detector for detecting light and producing image data; and (b) a wavelength conversion layer for converting said radiation into said light, said solid-state detector and said wavelength conversion layer being disposed in this order from an incident side of said radiation, said wavelength conversion layer including:

a first phosphor layer containing first phosphor particles dispersed in a binder; and a second phosphor layer containing second phosphor particles dispersed in a binder, the average particle diameter of said second phosphor particles being smaller than the average particle diameter of said first phosphor particles, wherein said first phosphor layer and said second phosphor layer are laminated in this order from the side of said solid-state detector, and said first phosphor layer is joined to or pressed against said solid-state detector, and said first and second phosphor layers are distributed such that the weight of said binder per unit thickness is gradually decreased to the side of said solid-state detector, and the weight of said binder of said first phosphor layer is heavier than the weight of said binder of said second phosphor layer at an interface between said first and second phosphor layers.

14. The radiation image capturing system according to claim 13, wherein said first phosphor particles include first small phosphor particles having a first average particle diameter, and first large phosphor particles having a second average particle diameter larger than said first average particle diameter.

15. The radiation image capturing system according to claim 14, wherein said second phosphor particles include second small phosphor particles having a third average particle diameter, and second large phosphor particles having a fourth average particle diameter larger than said third average particle diameter.

16. The radiation image capturing system according to claim 15, wherein said first and second phosphor particles are composed of $A_2O_2S:X$, wherein A represents one of Y, La, Gd, and Lu, and X represents one of Eu, Tb, and Pr.

* * * * *